United States Patent

Brickner

[15] 3,685,013

[45] Aug. 15, 1972

[54] SELF-ADJUSTING VEHICLE DETECTOR SYSTEM

[72] Inventor: Joseph L. Brickner, c/o Precision Winding Company, Inc., 2247 S. Grand Ave., Santa Ana, Calif. 92705

[22] Filed: Aug. 14, 1970

[21] Appl. No.: 63,670

[52] U.S. Cl. .............................................340/38 L
[51] Int. Cl. .............................................G08g 1/01
[58] Field of Search............................340/38 R, 38 L

[56] References Cited

UNITED STATES PATENTS

| 3,451,041 | 6/1969 | Marosi et al. | 340/38 L |
| 3,373,374 | 3/1968 | Marosi | 340/38 L |

FOREIGN PATENTS OR APPLICATIONS

| 1,209,985 | 10/1970 | Great Britain | 340/38 L |

*Primary Examiner*—Kathleen H. Claffy
*Assistant Examiner*—Randall P. Myers
*Attorney*—Rankin A. Milliken

[57] ABSTRACT

In this vehicle detector system a fixed frequency oscillatory signal produced by a voltage controlled, fixed frequency oscillatory signal source is passed to an untuned circuit including an inductive loop. A vehicle moving over the inductive loop will vary the inductance and the loading of the loop, and thus will vary the voltage amplitude of the oscillatory signal, which is rectified and amplified, and passed to an amplitude comparator circuit by means of which the amplitude of the rectified oscillatory signal is compared with the amplitude of a fixed voltage reference signal. The output of the comparator circuit is passed to a sample and hold circuit which provides the voltage feedback signal by which the voltage amplitude of the output of the oscillatory signal source is controlled. The sample and hold circuit also provides the input signal to the output relay driver amplifier. The sample and hold circuit produces output relay actuating signals in response to the rapid change of comparator output signals produced by the moving of a vehicle into position over the inductive pickup loop, but does not produce output relay actuating signals in response to slowly occurring events, such as the drifting of the parameters of the pickup loop due to moisture, changes in temperature, etc.

8 Claims, 4 Drawing Figures

INVENTOR
JOSEPH L. BRICKNER
ATTORNEY

INVENTOR
JOSEPH L. BRICKNER
BY Rankin D Miller
ATTORNEY

SELF-ADJUSTING VEHICLE DETECTOR SYSTEM

This invention relates to vehicle presence detecting systems wherein a vehicle moving over an inductive pickup loop embedded in the paving of a traffic lane of a street or highway will vary the inductive characteristics and other parameters of the loop, which variations are sensed to provide an output signal indicative of the presence of the vehicle.

Inductive-loop detecting systems of this general kind have long been known.

These prior art systems, however, have depended for their operation upon the shifting of the self-resonance peak of the inductive pickup loop produced by the moving of a vehicle into a position over the pickup loop. Thus, these prior art devices have been unduly sensitive to changes in the position of the pickup loop self-resonance peak produced by spurious factors such as moisture, ambient temperature, etc., and particularly to the effect of these spurious factors upon the distributed capacitance of the leads extending from the loop to the detector circuit. In addition, these prior art devices have suffered from the disadvantage that their installation necessarily involved the tuning of the loop and lead, or tuning of the detector circuit. These tuning problems in the prior art devices are particularly aggravated for the reason that existing vehicle detector loops vary considerably in loop area, lead length, adjacency to massive metallic bodies, etc., necessitating that these prior art frequency-dependent devices must be constructed with extremely broad tuning capabilities in order to accommodate even a reasonable percentage of existing vehicle detector loops. A further circumstance aggravating the tuning problems involved with these prior art frequency dependent inductive loop vehicle detecting systems is the tendency to crosstalk or cross-loading at the higher voltage levels which have been necessitated by the tuned input circuits through which these prior art devices are coupled to their associated pickup loops.

It is therefore an object of the present invention to provide a fixed frequency, amplitude feedback, self-adjusting vehicle detector system the operation of which is independent of the position of the self-resonance peak of its associated inductive pickup loop.

Another object of the present invention is to provide a vehicle detector system for use with an inductive pickup loop in which the loop is operated at low voltage and thereby interloop crosstalk is substantially completely avoided.

It is yet another object of the present invention to provide a self-adjusting vehicle presence detector system for use in conjunction with inductive pickup loops in which the deleterious effects of electrical leakage to ground have been substantially eliminated.

Still another object of the present invention is to provide a self-adjusting vehicle detector system for use with inductive pickup loops the sensitivity of which is not dependent upon the "Q" of the loop.

A further object of the present invention is to provide a self-adjusting vehicle detector system for use with inductive pickup loops which operates at a fixed frequency considerably below the self-resonant frequency of the loop, and consequently is not affected by variations in the distributed capacitance of the lead-in and other inherent resonant frequency instabilities.

Other objects of the invention will in part be obvious and will in part appear hereinafter.

The invention, accordingly, comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description, taken in connection with the accompanying drawings, in which.

Figure 1:
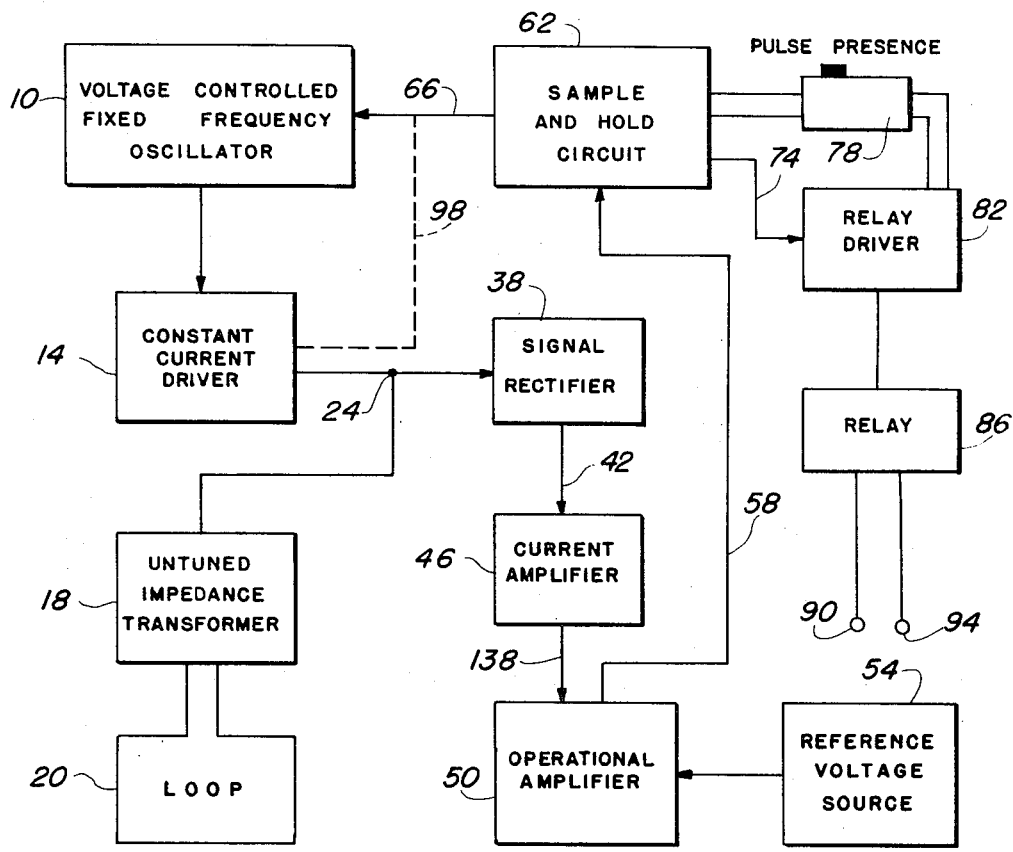
FIG. 1 is a system diagram of the vehicle detector of the present invention, wherein the various component circuits are shown as blocks.
Figure 2:
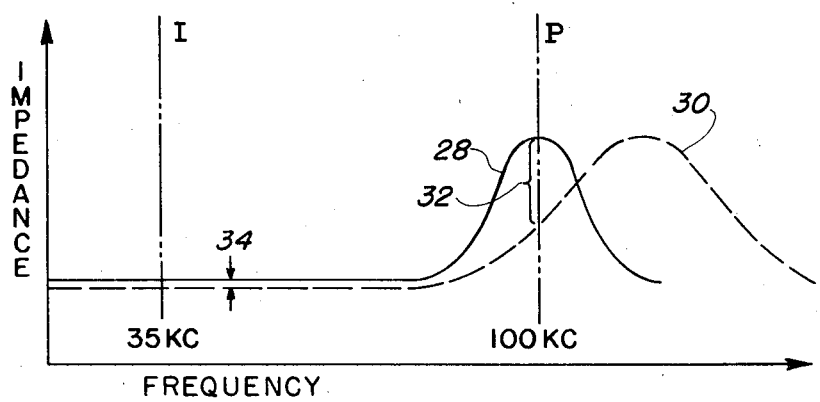
FIG. 2 is a schematic diagram representing the mode of operation of the device of the present invention as compared with the mode of operation of the devices of the prior art.

As shown schematically in FIG. 1, a vehicle detection system embodying the present invention may comprise a voltage-controlled, fixed-frequency oscillator 10, i.e., an oscillator whose output signal varies in amplitude in accordance with the amplitude of a received signal, while its frequency remains fixed, i.e., substantially constant. An example of an oscillator which may be thus employed is the well-known phase-shift oscillator. The oscillatory output signal of voltage-controlled, fixed-frequency oscillator 10 is applied to the input terminal of a vehicle responsive network generally comprising constant current amplifier 14, untuned impedance transformer 18, and inductive pickup loop 20. The output signal of constant current amplifier 14 is applied to the primary of an untuned impedance transformer 18, and thus excites an inductive pickup loop 20 which is connected across the secondary of untuned impedance transformer 18. When a vehicle moves over inductive pickup loop 20 it decreases the load impedance exhibited by the loop, since the vehicle, being inductively coupled to the loop 20, constitutes a shorted turn which dissipates energy from the loop. Furthermore, the effective inductance of the pickup loop 20 will be decreased by the presence of the vehicle, and thus the inductive reactance of loop 20 will decrease. The over-all effect, then, of the presence of a vehicle over inductive pickup loop 20 is to decrease the effective impedance of the loop. Since untuned impedance transformer 18, as described hereinafter, is carefully selected to match the effective impedance of inductive pickup loop 20 to the impedance of the detector circuit looking into the terminals to which the primary of untuned impedance transformer 18 is connected, i.e., to maximize the effect upon the detector circuit of the change in impedance of loop 20 produced by the presence of a vehicle above loop 20, the amplitude of the oscillatory signal appearing at point 24 decreases whenever a vehicle moves over inductive pickup loop 20. It is to be noted that, by contrast with the devices of the prior art, the detector circuit of the present invention is so constructed and arranged, particularly by proper selection of the untuned impedance matching transformer 18, as to be capable of detecting the very small changes of impedance produced by the presence of a vehicle over loop 20 when the operating frequency of oscillator 10 is well below the resonant frequency of loop 20 and its associated input circuit. In this connection, attention is directed to FIG. 2 wherein are shown two highly idealized curves representing impedance-versus-frequency characteristic curves of inductive pickup loop 20. The solid-line curve 28 peaking at frequency P represents the characteristic of inductive pickup loop 20 manifested in the absence of a vehicle thereabove, whereas the dashed-line curve 30 represents the impedance-versus-frequency characteristic of inductive pickup loop 20 when a vehicle is located thereabove. As may be seen in FIG. 2, the impedance decrement 32 produced by the presence of a vehicle over inductive pickup loop 20 when inductive pickup loop 20 is excited at a typical prior art operating frequency P, approximately equal to the resonant frequency of loop 20 and its associated input circuit, (e.g., 100 kilocycles) is many times greater than the impedance decrement 34 produced by the presence of a vehicle over inductive pickup loop 20 when inductive pickup loop 20 is excited at a sub-resonant frequency I, characteristic of the present invention (e.g., 35 kilocycles). In accordance with the present invention it is recognized that despite the fact that the impedance decrement produced at frequency I by the presence of a vehicle over inductive pickup loop 20 is far less than the impedance decrement produced at frequency P, the advantages in circuit stability, adaptability to a wide range of existing pickup loops, etc., as set out hereinabove, cause the vehicle detector systems embodying the present invention to be superior to the frequency-dependent vehicle detector systems of the prior art.

Returning now to FIG. 1, it may be seen that the signal amplitude which appears at point 24 is applied to the input of signal rectifier 38. Signal rectifier 38 is a circuit of the type which converts an alternating current to a direct current of corresponding amplitude, sometimes called a detector, and will generate a direct potential level on lead 42 which corresponds to the amplitude of the oscillatory signal at the abovesaid point 24. After passing through current amplifier 46, the signal appearing on lead 42 is applied to one of the input terminals of operational amplifier 50, which is connected as a summing amplifier. A reference voltage source 54 supplies a standard voltage to the other input terminal of operational amplifier 50. Operational amplifier 50 compares the signals applied to its abovesaid two input terminals, and produces upon line 58 a signal corresponding to the difference therebetween. As may also be seen in FIG. 1, the difference signal on line 58 is applied to the input of sample and hold circuit 62. Sample and hold circuit 62 serves to provide an amplitude control feedback signal to voltage-controlled, fixed-frequency oscillator 10 by way of lead 66. Sample and hold circuit 62 also serves to provide an output relay operating signal to relay driver 82 by way of lead 74. A mode switch 78 is provided, which serves to alter the circuit interconnections in both sample and hold circuit 62 and relay driver circuit 82, depending upon the position in which it is set. When mode switch 78 is in its PULSE position, the signal on lead 74 is effectively applied to the input of a 100 millisecond pulse-shaping circuit, so that the signal applied to the input terminal of relay driver amplifier circuit 82 is a 100 millisecond pulse, which occurs each time a vehicle moves into position over inductive pickup loop 20. Thus, output relay 86 is briefly closed each time a vehicle moves into position over inductive pickup loop 20, when mode switch 78 is in its PULSE position. Also, when mode switch 78 is in its PULSE position, sample and hold circuit 62 is so arranged that the amplitude control feedback signal appearing on lead 66 rapidly follows changes in the difference signal appearing on lead 58. Thus, when mode switch 78 is in its PULSE position, the amplitude of the oscillatory signal produced by voltage-controlled, fixed-frequency oscillator 10 varies in accordance with the variation of the effective impedance of inductive pickup loop 20. At the same time, i.e., when mode switch 78 is in its PULSE position, sample and hold circuit 62 serves to distinguish between slow variations in loop impedance, such as result from drifting due to moisture, temperature, or the like, and rapid changes of loop impedance resulting from the moving of a vehicle into position over loop 20. That is to say, slow changes of the difference signal occurring on lead 58, due, e.g., to drift of loop parameters, do not result in an output signal from sample and hold circuit 62 of sufficient magnitude to cause relay driver 82 to throw relay 86. On the other hand, rapid changes in the difference signal occurring on line 58 cause sample and hold circuit 62 to produce on line 74 a signal of sufficient amplitude to cause relay driver 82 to throw relay 86. Thus, when mode switch 78 is in its PULSE position, the circuit of the embodiment of FIG. 1 will bring about a brief closing of the internal circuit between terminals 90 and 94 of relay 86, e.g., 100 milliseconds, each time a vehicle passes over inductive pickup loop 20, but will not produce spurious closings of the internal circuit between terminals 90 and 94 due to drift of the loop parameters when no vehicle passes over inductive loop 20. When, on the other hand, mode switch 78 is in its PRESENCE position, the abovesaid pulse-shaping circuit is effectively short-circuited. Thus, relay driver 82 is not restricted to applying brief actuating pulses to relay 86, but rather can maintain relay 86 open for up to about 10 minutes (i.e., the period of sample and hold circuit 62), depending upon the nature of the signals applied to it over line 74. At the same time, when mode switch 78 is in its PRESENCE position, the long-term storage network of sample and hold circuit 62 is rendered operative. Said long-term storage network commences to discharge when a vehicle moves into position over inductive pickup loop 20, thereby raising the voltage on line 58 in a positive sense. While the long-term storage network is thus discharging, to a predetermined level, a signal is maintained on the input terminal of relay driver circuit 82 which is of sufficient amplitude to maintain relay 86 in closed condition, i.e., internal circuit closed between terminals 90 and 94. If, when mode switch 78 is in its PRESENCE position, a vehicle remains in position over inductive pickup loop 20 for more than the effective term of said long-term storage network, e.g., ten minutes, said long-term storage network becomes discharged to said predetermined level. When said long-term storage network becomes discharged to said predetermined level the input signal to relay driver 82 drops to a value at which relay 86 drops out, i.e., the internal circuit between terminals 90 and 94 opens. If, on the other hand, when mode switch 78 is in its PRESENCE position, a vehicle moves into position over inductive pickup loop 20 and then departs therefrom before the expiration of the effective term of said long-term storage network, said long-term storage network will be rapidly recharged. When early recharging of said long-term storage network thus takes place, the same consequences will ensue, viz., the feedback signal on line 66 will resume its quiescent value, and relay 86 will drop out, i.e., the internal circuit between terminals 90 and 94 will be opened.

In the PRESENCE mode, just as in the PULSE mode, sample and hold circuit 62 serves to distinguish between slow variations in loop impedance, such as result from drifting due to moisture, temperature, or the like, and rapid changes of loop impedance resulting from the moving of a vehicle into position over loop 20.

While the embodiment of the present invention described hereinabove, and that described in detail hereinbelow in connection with FIGS. 3A and 3B, employ a voltage-controlled, fixed-frequency oscillator 10 the amplitude of the oscillatory output signal of which is controlled by a feedback signal on line 66, it is to be understood that certain embodiments of the present invention described in more detail hereinbelow employ, instead, a fixed-frequency oscillator the amplitude of the signal produced by which is not varied, and, in these alternative embodiments, the feedback signal of line 66 passes instead over a line 98 to the constant current amplifier 14, the self-adjustment of the circuit then being accomplished by the variation of the operating point of constant current amplifier in response to the feedback signal from sample and hold circuit 62 conveyed to a suitable control network in constant current amplifier 14 by way of alternative feedback lead 98.

Having now described the broad operating principles of certain embodiments of the present invention in connection with FIG. 1, a particular circuit embodying the present invention will now be described in detail.

Figure 3A:
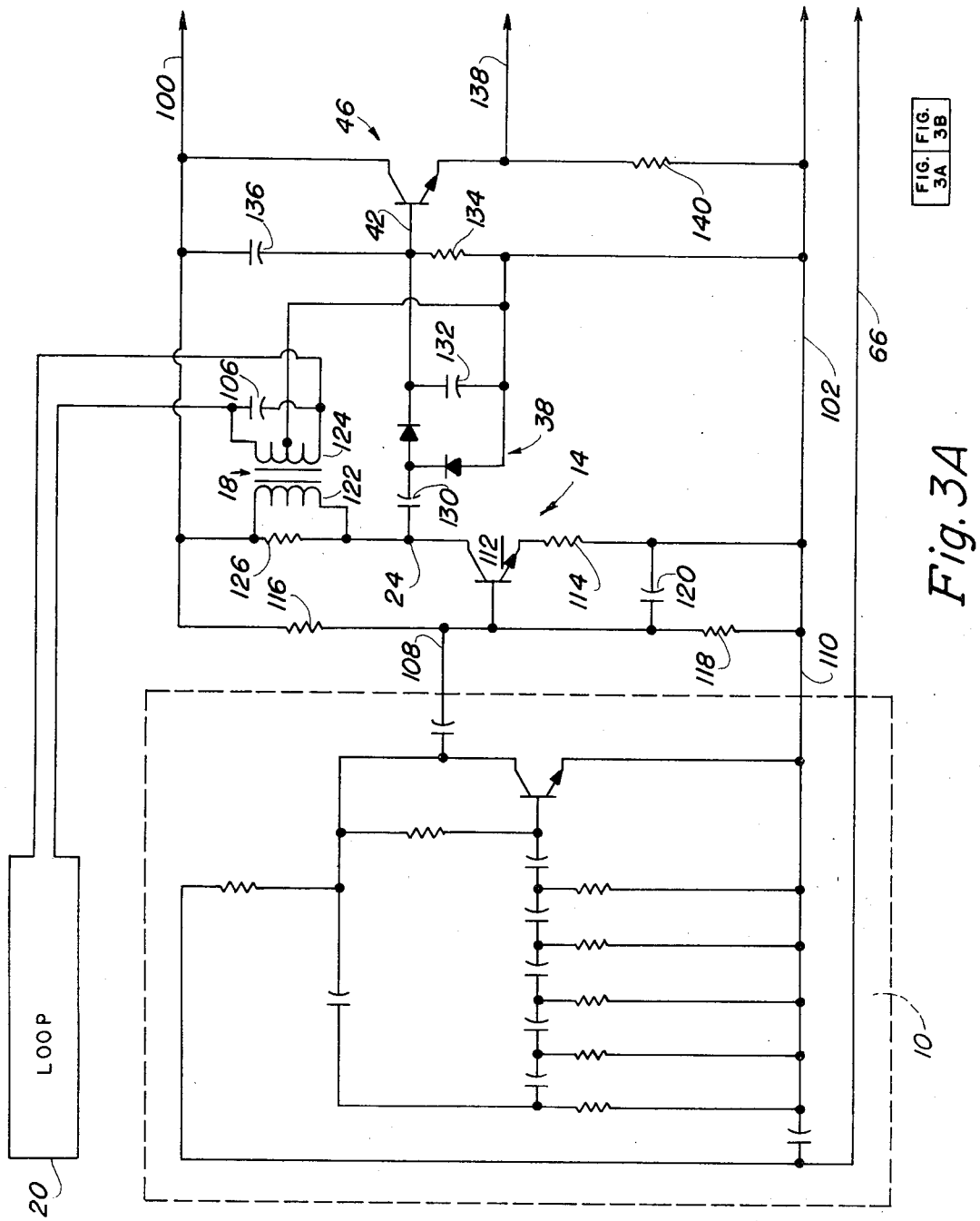
FIGS. 3A and 3B, taken together, constitute a detailed circuit diagram of a preferred embodiment of the present invention.
Figure 3B:
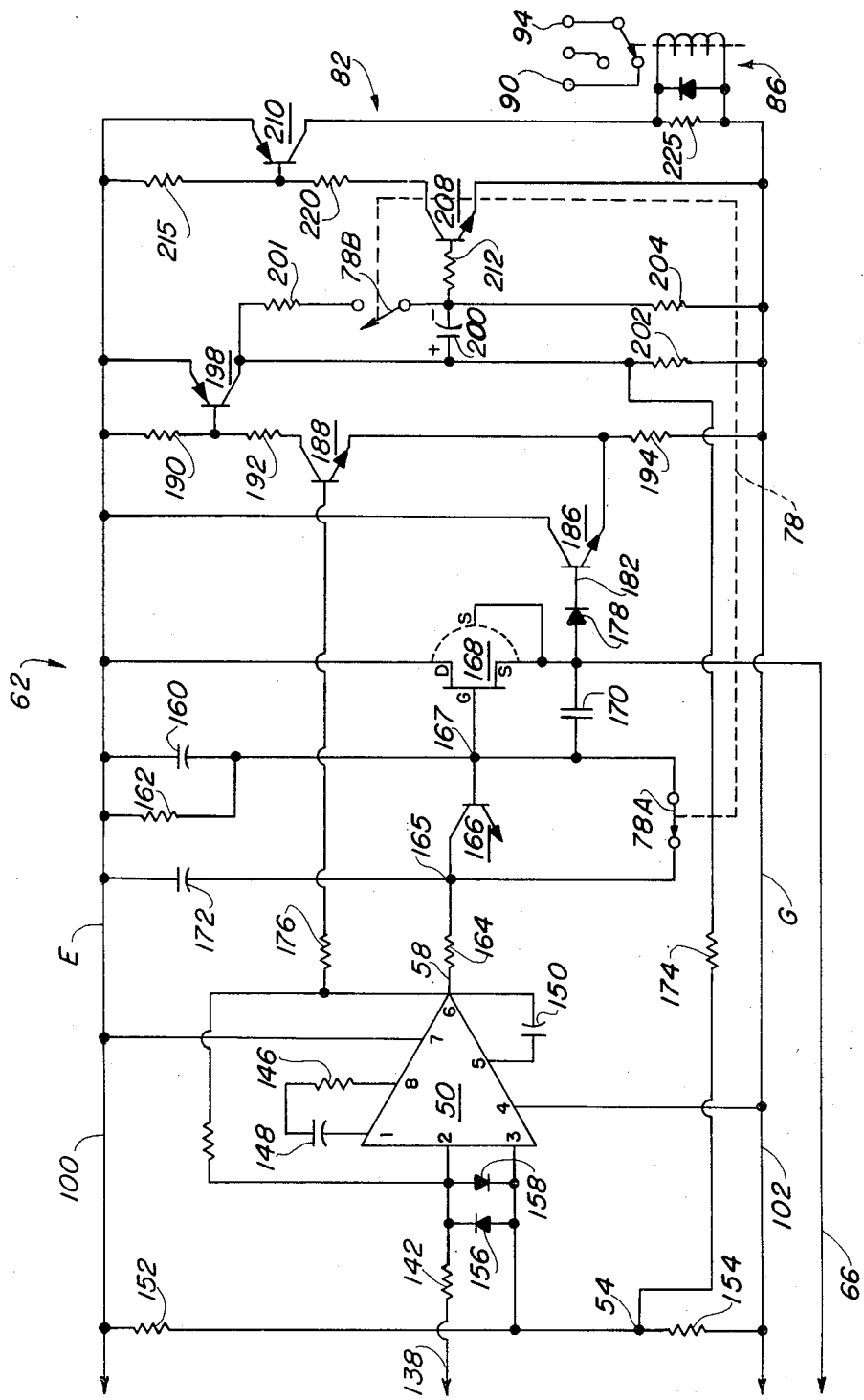

Reference is now had to FIGS. 3A and 3B, which, taken together, constitute a detailed schematic diagram of a particular circuit embodying the present invention.

Referring not to FIGS. 3A and 3B, taken together, it is to be understood that a voltage E, which is positive with respect to ground, is maintained on buss 100 by means of a power supply (not shown) of the type which may readily be supplied by those having ordinary skill in the art without the exercise of invention.

It is also to be understood that buss 102 is maintained at ground potential, hereinafter designated G.

Further, it is to be understood that, though not shown herein, the detector system of the invention may be provided with a solid state output, rather than a relay output, or both, and that the solid state output may be driven by relay driver 82 within the scope of the present invention.

According to a characteristic feature of the present invention capacitor 106, which is shunted across the terminals of the secondary winding of impedance matching transformer 18, is not a tuning capacitor. Rather, capacitor 106 serves only to shunt out spurious high-frequency signals, and does not resonate with inductive pickup loop 20 at the substantially fixed operating frequency of voltage-controlled oscillator 10.

Voltage-controlled oscillator 10 is of the type well-known to those having ordinary skill in the art as phase-shift oscillators. In accordance with the well-known properties of such circuits, the operating frequency of oscillator 10 will remain substantially constant despite variations in load, i.e., whether a vehicle is present over loop 20 or otherwise.

In accordance with a particular feature of the present invention the operating frequency of oscillator 10 may, for instance, be about 35 kilocycles, in contrast with the considerably higher operating frequencies of the well-known frequency-dependent loop detector systems of the prior art.

Further, according to well-known operating principles of the phase-shift oscillator, the voltage amplitude of the oscillatory output signal of oscillator 10 is determined by the magnitude of the feedback signal on feedback line 66.

The oscillatory output signal of oscillator 10 appears upon lines 108 and 110, whereby it is fed to the input terminals of constant current loop driver 14.

The constant current loop driver 14 comprises a transistor 112 having a base electrode coupled to lead 108 upon which appears the output of voltage-controlled oscillator 10. The emitter electrode of transistor 112 is coupled to the ground potential G existing on buss 102 through a resistor 114. The collector electrode of transistor 112 is directly connected to point 24, which is itself coupled to E potential on buss 100 through the parallel combination of the primary of impedance matching transformer 18 and a resistor which may, for instance, have the resistance value of 10,000 ohms.

Typically, resistors 116 and 118 may be 10,000 ohm resistors, and capacitor 120 may be a 30 picofarad capacitor.

Also, in accordance with a feature of the present invention, oscillator 10 may be epoxy-potted, thereby tending to "smooth" the drift of oscillator 10, i.e., render it sensitive only to slowly-occurring temperature changes, and not to short-term, abrupt temperature changes.

By way of example, an impedance matching transformer 18 designed according to the principles of the present invention may comprise two low-capacity windings on a toroidal Permalloy core. Primary winding 122 may be wound with approximately 1,000 turns, while, at the same time, secondary winding 124 is wound with approximately 83 turns. Capacitor 106 which, as noted above, is not a tuning capacitor, but rather a shunting capacitor for spurious, high frequency signals, may typically have a value of 0.01 microfarads.

The parallel combination of resistor 126 (e.g., 10,000 ohms) and primary 122 of untuned impedance matching transformer 18 is coupled as a load to constant current driver 14. The losses of inductive pickup loop 20 and a lead-in cable extending between loop 20 and impedance matching transformer 18 will contribute to the load on constant current driver 14.

A vehicle moving over loop 20 will decrease the load impedance, since the vehicle, being inductively coupled to the loop 20, constitutes a shorted turn in which energy coupled from loop 20 will be dissipated. Further, the inductance of pickup loop 20 will be decreased by the presence of a vehicle thereover. The over-all effect of the presence of a vehicle above inductive pickup loop 20 is therefore to decrease the amplitude of the oscillatory signal appearing at point 24.

Signal rectifier 38 is a circuit of the type sometimes known as a diode demodulator or diode detector. Typical values of the components of signal rectifier circuit 38 are: capacitor 130, 0.15 microfarads; capacitor 132, 0.22 microfarads; resistor 134, 10 Megohms; capacitor 136, 0.22 microfarads.

In considering the operation of signal rectifier 38 as a demodulator or detector in the circuit of FIGS. 3A and 3B, the operating frequency of voltage-controlled oscillator 10 may be taken as the carrier frequency, and the variations in amplitude of the oscillatory signal appearing at point 24 which are brought about by the presence or absence of vehicles in position over loop loop 20 and the drift of circuit parameters, including the parameters of loop 20 and the lead-in extending therefrom to the detector of the invention, may be thought of as constituting the modulation envelope.

In accordance with the well-known principles of such demodulation circuits, then, it may be seen that a direct current potential the amplitude of which varies in accordance with variations in the amplitude of the oscillatory signal appearing at point 24 will be produced on lead 42.

This signal on lead 42 is, by that fact, applied directly to the base electrode of the transistor of current amplifier 46. As may be seen in FIG. 3A, current amplifier 46 is of a well-known type, the output of which passes through lead 138. Current amplifier 46 is non-inverting. Resistor 140 may, typically, have a value of 10,000 ohms.

The output signal of current amplifier 46 passes, via lead 138 to input terminal 2 of operational amplifier 50 through a resistor 142, the value of which may, typically, be 1,000 ohms.

Operational amplifier 50, in the embodiment of the present invention shown in FIGS. 3A and 3B, is an integrated circuit chip which is widely known by those having ordinary skill in the art under the standard trade designation "709." The output signal of chip 50 is, typically, fed back to input terminal 2 through a 150,000 ohm resistor. Additionally, connection is provided between terminals 8 and 1 of chip 50 through an RC series network consisting of a resistor 146 and a capacitor 148. Typical values of resistor 146 and capacitor 148 are: resistor 146, 1.5 kilohms; capacitor 148, 1,000 picofarads. A capacitor 150 is connected between terminals 5 and 6 of chip 50. Typically, the value of capacitor 150 may be 1,000 picofarads.

A standard reference potential is supplied to terminal 3 of chip 50 by means of a voltage divider consisting of resistors 152 and 154. Resistors 152 and 154 are connected in series between busses 100 and 102, and reference voltage source 54 is their common terminal. Typically, resistors 152 and 154 may be 4.7 kilohm resistors.

Diodes 156 and 158 are used, in the well-known manner, to limit the deviation between the voltage levels on terminals 2 and 3 of chip 50, thereby preventing the condition known to those having ordinary skill in the operational amplifier art as "lockup".

As shown in FIG. 1, the input signal to sample and hold circuit 62 (sometimes called hereinafter simply the "hold circuit") is derived from point 58.

Before describing hold circuit 62, however, the behavior of the signal at point 58 will be described. This signal is characterized by a quiescent (no vehicle in position over loop 20) value. The quiescent value of the signal at point 58 is dependent upon the impedance of the particular pickup loop 20 to which the circuit of the invention is connected. By way of example only, the quiescent signal voltage at point 58 may be taken as in the neighborhood of ten volts positive with respect to ground. However, when a vehicle moves into position over inductive pickup loop 20 the signal at point 58 may rise to as much as 20 volts positive with respect to ground.

Further, before discussing hold circuit 62 in detail, it should be noted that mode switch 78 consists of two mechanically-ganged single-pole single-throw switches, viz., 78A and 78B. Switch 78A is closed in the PULSE mode, and open in the PRESENCE mode; whereas switch 78B is closed in the PRESENCE mode, and open in the PULSE mode.

The long-term storage network of hold circuit 62 consists of capacitor 160 and resistor 162 (FIG. 3B). To achieve desirable long storage time, capacitor 160 may be a 5 microfarad capacitor, and resistor 162 may be a 30,000 megohm resistor. In order to sufficiently reduce leakage, capacitor 160 must be a Polycarbonate, or equivalent synthetic dielectric, capacitor.

As will be further described hereinafter, hold circuit 62 is further characterized by an alternative, short-term, RC circuit comprising capacitor 160 and a resistor 164, the value of which may typically be 4.7 megohms.

The base and collector electrodes of transistor 166 are connected to the terminals of switch 78A. The emitter of transistor 166 is isolated, i.e., unconnected to any other point in the circuit. Thus, it may be seen that transistor 166 is used as a diode, it being well-known that transistors so used have a much higher reverse leakage impedance than most diodes. In discussing the present circuit, then, transistor 166 may be thought of as an equivalent diode, having its anode connected directly to point 167, and its cathode connected directly to point 165. Since switch 78A is connected directly across this equivalent diode, it may now be seen that in the PULSE mode, when switch 78A is closed, point 165 is directly connected to point 167, whereas in the PRESENCE mode, when switch 78A is open, said equivalent diode may be considered to be connected between points 165 and 167.

Hold circuit 62 further comprises a MOSFET 168. According to a feature of the device of the present invention, MOSFET 168 is a 3N128 MOSFET, produced by the Radio Corporation of America. A noise suppression capacitor 170 is connected between the gate electrode and the source electrode of MOSFET 168. Noise suppression capacitor 170 may, typically, have a capacity of 700 picofarads.

Noise suppression capacitor 172 may, typically, have a capacity of 0.22 microfarads.

An on-off hysteresis resistor 174 is provided, which squares or standardizes the current pulse provided to the output relay, and therefore prevents the output relay from chattering, or, alternatively, if a solid state output is provided, prevents the generation of spurious transient impulses in the solid state output.

One terminal of a resistor 176, the function of which will be hereinafter described, is directly connected to point 58. Resistor 176 may, typically, have a value of 22,000 ohms.

The output section of hold circuit 62 comprises a diode 178 which feeds the base 182 of a transistor 186. The output of transistor 186 provides emitter bias for a second transistor 188, which is connected in cascade with an additional transistor 198.

The output divider network in the collector circuit of transistor 188 is comprised of resistors 190 and 192, which may, typically, have values of 22,000 ohms and 10,000 ohms, respectively.

Emitter bias resistor 194 may, typically, have a value of 10,000 ohms.

Transistor 198 is cascaded with transistor 188 in order to sharpen the output signals from transistor 198, which are passed on to relay driver 82. In the PULSE mode of operation, when switch 78B is open, the output signals from transistor 198 are applied to the pulse-shaping network consisting of capacitor 200 and resistors 202 and 204. Thus, in the PULSE mode of operation, the actuating signals supplied to relay driver 82 are pulses whose width is determined by the parameters of said pulse-shaping circuit. By way of example, capacitor 200 may have a capacity of 5 microfarads, resistor 202 may have a value of 22,000 ohms, and resistor 204 may have a value of 6.8 kilohms, in which case the pulses supplied to relay driver 82 will have a width of approximately 100 milliseconds.

Suitable values for the resistors found in relay driver 82 are: resistor 212, 10 kilohms; resistor 215, 22 kilohms; resistor 220, 10 kilohms; resistor 225, 10 kilohms.

OPERATION OF SAMPLE AND HOLD CIRCUIT

Pulse mode

In this mode switch 78A is closed, and points 165 and 167 are directly, short-circuitedly connected. Also, switch 78B is open, and pulse-shaping network 200, 202, 204 is operatively interconnected between the output of transistor 198 and the input of relay driver 82. Let it be assumed that for at least several seconds there has been no vehicle over or near inductive pickup loop 20, and that, thus, the voltage at circuit point 58 (the output terminal of operational amplifier chip 50) has assumed its quiescent value, which will be assumed for purposes of this discussion to be ten volts positive with respect to ground. Since the short-term storage network 160, 164 has charged to the extent permitted by circuit conditions then existing, the voltage at point 167 is substantially equal to the voltage at point 58. The voltage at point 167, however, is applied to the gate electrode of MOSFET 168, which is connected as a source-follower. In accordance with the well-known properties of MOSFET source-follower circuits, the voltage at point 167 will differ from the voltage at the source terminal of the MOSFET by the gate-source voltage. The anode of diode 178 is directly, short-circuitedly connected to the source terminal of MOSFET 168. Further, the cathode of diode 178 is directly, short-circuitedly connected to the base electrode 182 of transistor 186. Thus, as will be recognized by those having ordinary skill in the art, diode 178 will act as a bias-setting diode, and will tend to restore the gate-source drop, causing the potential on the base electrode 182 of transistor 186 to closely follow the potential at the gate terminal of MOSFET 168, i.e., to closely follow the potential at point 167. As will be evident to those having ordinary skill in the art, then, MOSFET 168 is employed because of its very high input impedance, i.e., MOSFET 168 makes it possible to "sample" the potential on the lower plate of storage capacitor 160 without rapidly draining storage capacitor 160. This is especially important, of course, in the PRESENCE mode of operation, which depends upon the long-time constant of long-term storage network 160, 162. The feedback signal on feedback line 66 is derived from the source terminal of MOSFET 168, and thus will be equal to the potential at point 167 but for the gate-source voltage of MOSFET 168. Since the circuit of FIGS. 3A and 3B is assumed to have "settled" in its quiescent (no vehicle) state, it follows that the amplitude of the oscillatory output signal of oscillator 10, under the control of the feedback signal on feedback line 66, has assumed a quiescent value, determined in part by the quiescent (no vehicle) impedance of inductive pickup loop 20. Recalling, now, that, at the instant assumed, the circuit is PULSE mode and has "settled" in its quiescent (no vehicle) state, the operation of transistors 186 and 188 will now be considered. The base of transistor 188 is connected to point 58 (output of operational amplifier chip 50) through resistor 176. As explained hereinabove, the potential on the base electrode 182 of transistor 186 is substantially equal to the potential at point 167. Since, by assumption, the circuit has "settled" in its quiescent state, there is substantially no drop across resistor 164, and the potential at point 58 is substantially equal to the potential at point 167. Because of the design of the network including transistors 186 and 188, the output from transistor 188 when the bias on its base is substantially equal to the bias on base 182 of transistor 186 is insufficient to close relay 86 (assuming switch 78B to be closed). Put differently, the network including transistors 186 and 188 is so arranged that transistor 186 controls the bias on transistor 188 and thus causes the output from transistor 188 to assume a "relay open" value when the signals on the bases of these transistors are substantially equal.

Let it now be assumed that, in the PULSE mode, a vehicle moves into position over inductive pickup loop 20. As explained hereinabove, the potential at point 58 will substantially instantaneously become considerably more positive with respect to ground than its quiescent potential level. Due to the properties of the short-term storage network 160, 164, however, the potential at the base electrode 182 of transistor 186 cannot instantaneously follow the positive rise in potential at point 58. Rather, as may be determined empirically in a circuit constructed in accordance with FIGS. 3A and 3B, the potential at point 182 does not again become equal to the potential at point 58 until the elapse of an interval which is of the order of hundreds of milliseconds. (As will be evident to those having ordinary skill in the art, said interval is far less than the time constant of the short-term storage network 160, 164 (24 seconds), being determined by the dynamic properties of the feedback loop, including the high gain of operational amplifier chip 50.) Due to the design of the network including transistors 186 and 188, the output of transistor 188 rises to a "relay closed" level during said interval, i.e., when the base of transistor 188 is more positive than the base of transistor 186. Since, per assumption, the circuit is in the PULSE mode, switch 78B is open, and the "relay closed" output from transistor 188, further amplified by transistor 198, is applied to pulse-shaping network 200, 202, 204 before being applied to the base of relay driver transistor 208. Thus, due to the properties of the pulse-shaping network, the driving signal supplied by relay driver 82 to relay 86 will be a pulse-like signal having a duration of approximately 100 milliseconds, and relay 86 will close for a correspondingly short interval.

In view of the above, it may be seen that, in the PULSE mode of operation, after "settling" in its quiescent state, the circuit of FIGS. 3A and 3B will briefly close relay 86 when a vehicle moves into position over loop 20, and, after a neutralization interval of the order of hundreds of milliseconds, will again briefly close relay 86 in response to the moving of a second vehicle into position over loop 20, whether or not the first vehicle has departed from its position over loop 20.

Presence Mode

In the PRESENCE mode switch 78A is open, and transistor 166 acts as a high reverse leakage diode connected between points 165 and 167, with its anode connected to point 167. Also, in the PRESENCE mode, switch 78B is closed, and thus the effect of the pulse-shaping network 200, 202, 204 is eliminated, and relay 86 can be held closed as long as the output of transistor 188 is at a "relay closed" level. Let it be assumed that the circuit of FIGS. 3A and 3B, in the PRESENCE mode, has "settled" in its quiescent (no vehicle) state, and that then a vehicle moves into position over inductive pickup loop 20. As explained hereinabove, the voltage at point 58 will substantially instantaneously rise in a positive direction from ground. Thus, the voltage on the base electrode of transistor 188 will substantially instantaneously become more positive, and relay 86 will be closed. Due to the closed position of switch 78B, relay 86 will remain closed so long as a "relay closed" level signal remains on the output of transistor 188. In the PRESENCE mode of operation, in contrast to the PULSE mode of operation, the potential at point 182 does not become equal to the potential at point 52 after a short interval (e.g., a few hundreds of milliseconds), because transistor 166 blocks the circuit path of short-term storage network 160, 164, and thus the potential at point 182 is determined, instead, by the long-term storage network 160, 162, provided that the vehicle remains over loop 20 for the duration of the effective delay interval of the long-term storage circuit. By "effective delay interval of the long-term storage circuit" is meant that interval extending from the time when, in response to a vehicle moving into position over loop 20, the potential at point 50 begins to rise to the time when capacitor 160 has sufficiently discharged, through resistor 162, so that the potential at point 182 has just reached the level at which the output from transistor 188 goes from the "relay closed" condition to the "relay open" condition. The effective delay interval of the long-term storage circuit of FIG. 3B is approximately 10 minutes, at the end of which interval relay 86 "drops out," and the circuit has returned to its quiescent state despite the continued presence of the vehicle over inductive pickup loop 20.

If, on the other hand, the vehicle leaves its position above loop 20 before the termination of the effective delay interval of the long-term storage circuit, the potential at point 58 will shift toward its quiescent value, thus forward-biasing the base-collector junction of transistor 166, and permitting storage capacitor 160 to rapidly recharge. Thus, in the PRESENCE mode, when the vehicle leaves its position over loop 20 before the expiration of the effective delay interval of the long-term storage network, relay 86 opens substantially immediately, and the circuit resumes its quiescent state.

It will be appreciated that by the above-described circuit a self-adjusting vehicle detector system, for use with existing or newly-installed inductive pickup loops, is provided, the operation of which is independent of the position of the self-resonance peak of the pickup loop, and which has other advantages set forth hereinabove.

It will thus be seen that the objects set forth above, among those made apparent from the preceding description, are efficiently attained, and, since certain changes may be made in the above systems without departing from the scope of the invention, it is intended that all matter contained in the above description or shown in the accompanying drawings shall be interpreted as illustrative only, and not in a limiting sense.

It is particularly noted that although the invention has been disclosed as embodied in a system comprising a voltage-controlled, fixed-frequency oscillator, certain embodiments which employ fixed-amplitude, fixed-frequency oscillators also fall within the scope of the present invention. In one such non-variable oscillator embodiment, for instance, the feedback signal on feedback line 66 is applied to a magnetic amplifier of the type which operates as a voltage-to-impedance converter. This magnetic amplifier serves to alter the emitter impedance of the constant current driver, thus restoring the amplitude of the alternating current signal at circuit point 24 after a vehicle has moved into position over loop 20, the operation of the circuit being otherwise the same as the operation of the circuit described in detail hereinabove.

In another non-variable oscillator embodiment, a solid-state voltage-to-impedance converter may be employed, rather than the magnetic amplifier voltage-to-impedance converter of the previous embodiment.

According to another alternative embodiment of the present invention, impedance matching transformer 18 is dispensed with, and instead the lead-in from inductive pickup loop 20 is connected across the emitter resistor of the constant current driver, in which case a suitable capacitor may be inserted between the end of one lead and the corresponding terminal of the emitter resistor.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A vehicle detector system, comprising:
    an inductive loop positioned adjacent a vehicular traffic path;

signal source means for providing a first oscillatory signal the amplitude and frequency of which are substantially independent of the movement of vehicles on said vehicular traffic path past said inductive loop and are substantially independent of the electrical parameters of said inductive loop, the amplitude of said first oscillatory signal being controlled by an electrical feedback signal;

vehicle responsive means including said inductive loop for receiving said first oscillatory signal and producing a second oscillatory signal the amplitude of which relative to the amplitude of said first oscillatory signal varies when a vehicle moves past said inductive loop on said vehicular traffic path, said inductive loop being non-resonant with any other part of said vehicle responsive means at the frequency of said first oscillatory signal; and feedback means responsive to said second oscillatory signal and coupled to said signal source means for supplying said electrical feedback signal thereto.

2. A vehicle detector system as claimed in claim 1 in which said vehicle responsive means comprises an impedance matching transformer across the secondary winding of which said inductive loop is connected, and a capacitor connected across the secondary winding of said impedance matching transformer, the capacitance of said capacitor being such that it does not resonate with the inductance of said pickup loop at the frequency of said first oscillatory signal.

3. A vehicle detector system as claimed in claim 1 in which said vehicle responsive means comprises a solid state constant current driver circuit including a transistor having an impedance in its emitter circuit, and the terminals of said inductive loop are connected across said impedance.

4. A vehicle detector system as claimed in claim 1 in which said feedback means includes a MOSFET connected in circuit as a source-follower and a resistance-capacitance network supplying a control signal to the gate electrode of said MOSFET, and said electrical feedback signal is derived from the output of said MOSFET source-follower.

5. A vehicle detector system, comprising:
an inductive loop positioned adjacent a vehicular traffic path;
signal source means for providing a first oscillatory signal the amplitude and frequency of which are substantially independent of the movement of vehicles on said vehicular traffic path past said inductive loop and are substantially independent of the electrical parameters of said inductive loop, the operation of said signal source means being controlled by an electrical feedback signal;
vehicle responsive means including said inductive loop for receiving said first oscillatory signal and producing a second oscillatory signal the amplitude of which relative to the amplitude of said first oscillatory signal varies when a vehicle moves past said inductive loop on said vehicular traffic path, said inductive loop being non-resonant with any other part of said vehicle responsive means at the frequency of said first oscillatory signal; and
feedback means responsive to said second oscillatory signal and coupled to said signal source means for supplying said electrical feedback signal thereto.

6. A vehicle detector system as claimed in claim 5 in which said feedback means includes a MOSFET connected in circuit as a source-follower and a resistance-capacitance network supplying a control signal to the gate electrode of said MOSFET, and said electrical feedback signal is derived from the output of said MOSFET source-follower.

7. A vehicle detector system as claimed in claim 5 in which said feedback means comprises a MOSFET and a resistance-capacitance network including a capacitor and being capable of maintaining a voltage thereacross for a predetermined interval of time, said resistance-capacitance network being coupled to the gate connection of said MOSFET, and the high input impedance of said MOSFET minimizing leakage from said capacitor.

8. A vehicle detector system comprising an oscillator for generating an oscillatory signal, said oscillator being controlled by an electrical feedback signal, a constant current driver coupled to said oscillator to receive the oscillatory signal therefrom, an untuned circuit coupled to said constant current driver, said untuned circuit including means for coupling an inductive loop thereto, rectifying means coupled to said untuned circuit for generating a first signal varying in accordance with the amplitude of the oscillatory signal appearing across said untuned circuit, an operational amplifier connected as a summing amplifier for comparing said first signal with a standard voltage to thereby generate a second signal varying in accordance with the amplitude of the oscillatory signal appearing across said untuned circuit, a feedback signal generating circuit including a storage capacitor and a diode-connected transistor coupled between the storage capacitor and said operational amplifier for passing variations of one polarity of said second signal to charge the storage capacitor, said feedback signal generating circuit further including a MOSFET for passing a signal from said storage capacitor to said oscillator for controlling said oscillator, whereby leakage from said storage capacitor is minimized.

* * * * *